United States Patent
Kurata

[11] Patent Number: 5,852,515
[45] Date of Patent: Dec. 22, 1998

[54] MICROSCOPE OBJECTIVE AND SINGLE OBJECTIVE TYPE BINOCULAR STEREOMICROSCOPE SYSTEM

[75] Inventor: Kiyonobu Kurata, Hachioji, Japan

[73] Assignee: Olympus Optical Co., Ltd., Tokyo, Japan

[21] Appl. No.: 852,513

[22] Filed: May 7, 1997

[30] Foreign Application Priority Data

May 8, 1996 [JP] Japan .................................. 8-113613
Apr. 1, 1997 [JP] Japan .................................. 9-082757

[51] Int. Cl.$^6$ .................................................. G02B 21/02
[52] U.S. Cl. ........................... 359/660; 359/368; 359/656
[58] Field of Search ..................................... 359/362, 368, 359/385, 377–382, 659–662, 795

[56] References Cited

U.S. PATENT DOCUMENTS

| | | | |
|---|---|---|---|
| 3,262,363 | 7/1966 | Ziegler | 359/661 |
| 4,518,231 | 5/1985 | Muchel et al. | 359/661 |
| 4,640,586 | 2/1987 | Iba et al. | 359/659 |
| 5,074,650 | 12/1991 | Yamagishi et al. | 359/377 |
| 5,500,770 | 3/1996 | Zinter et al. | 359/368 |
| 5,532,879 | 7/1996 | Hayashi | 359/660 |
| 5,701,196 | 12/1997 | Nakamura | 359/661 |

FOREIGN PATENT DOCUMENTS 62-178918  8/1987  Japan .

*Primary Examiner*—Thong Nguyen
*Attorney, Agent, or Firm*—Cushman Darby & Cushman IP Group of Pillsbury Madison & Sutro LLP

[57] ABSTRACT

The invention provides an objective system for use on a single objective type binocular stereomicroscope which, albeit having a parfocal length thereof shorter than a focal length thereof, can reduce various aberrations as much as possible, and a single objective type binocular stereomicroscope system which can be well manipulated while the viewing position is invariable even when objective lenses are interchanged. The objective system for use on a single objective type binocular stereomicroscope comprises an objective lens for converting light from an object into an afocal light flux and two viewing optical units for receiving light emanating from the objective lens to form left and right images, which satisfies condition: 1.0<FL/L<1.6 where FL is a focal length of the objective system, and L is a distance from a first lens surface of the objective system on an image point side to a sample surface.

13 Claims, 10 Drawing Sheets

Spherical aberration
NA 0.03

Astigmatism
FIY 52.40

Distortion
FIY 52.40

Spherical aberration
NA 0.03

Astigmatism
FIY 52.40

Distortion
FIY 52.40

Spherical aberration

Astigmatism

Distortion

Spherical aberration

Astigmatism

Distortion

Spherical aberration
NA 0.05

Astigmatism

Distortion

Spherical aberration
NA 0.05

Astigmatism

Distortion

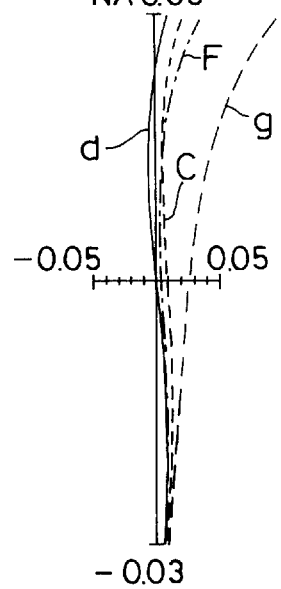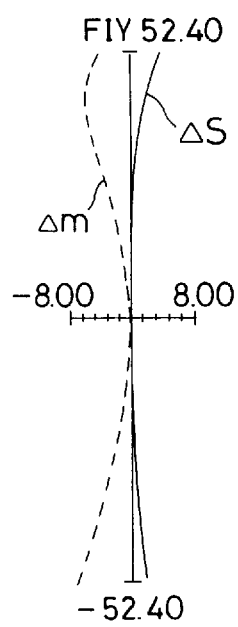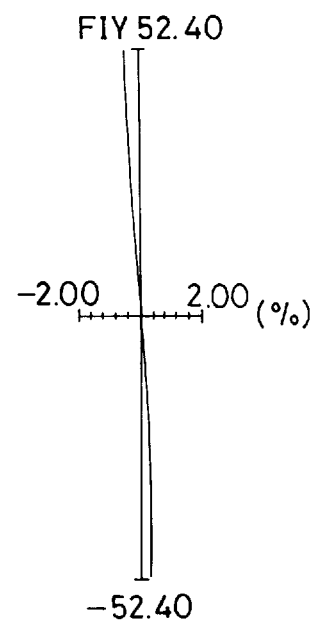

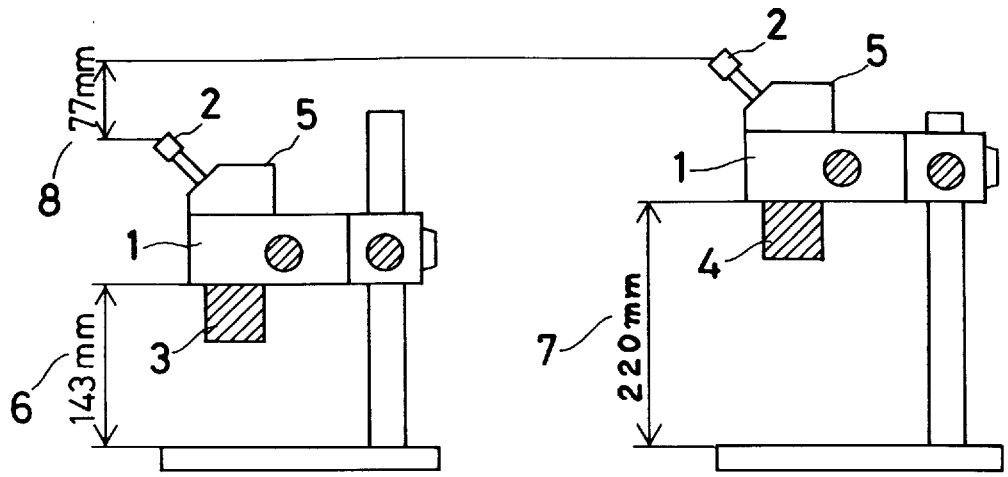
FIG.15(a)    FIG.15(b)
FIG. 16
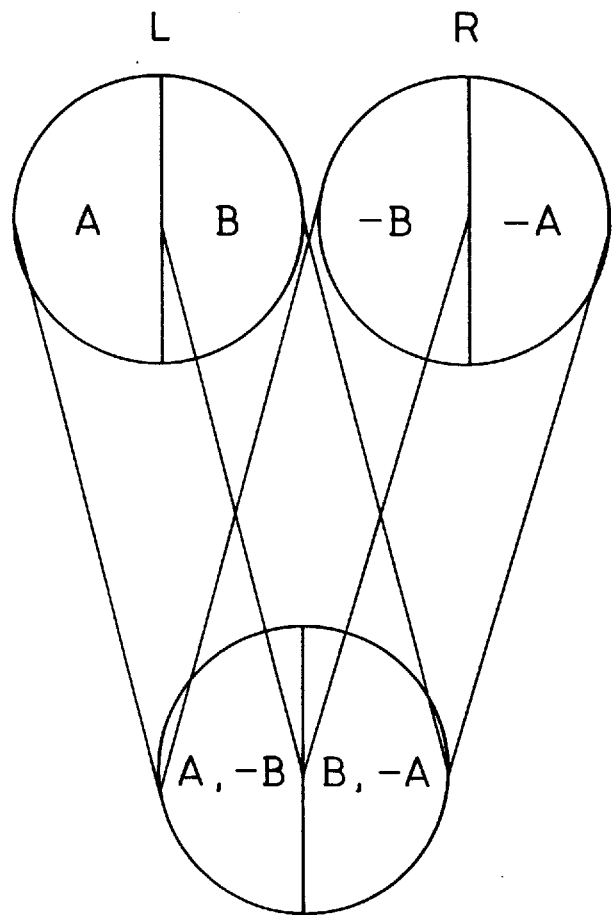

FIG. 17
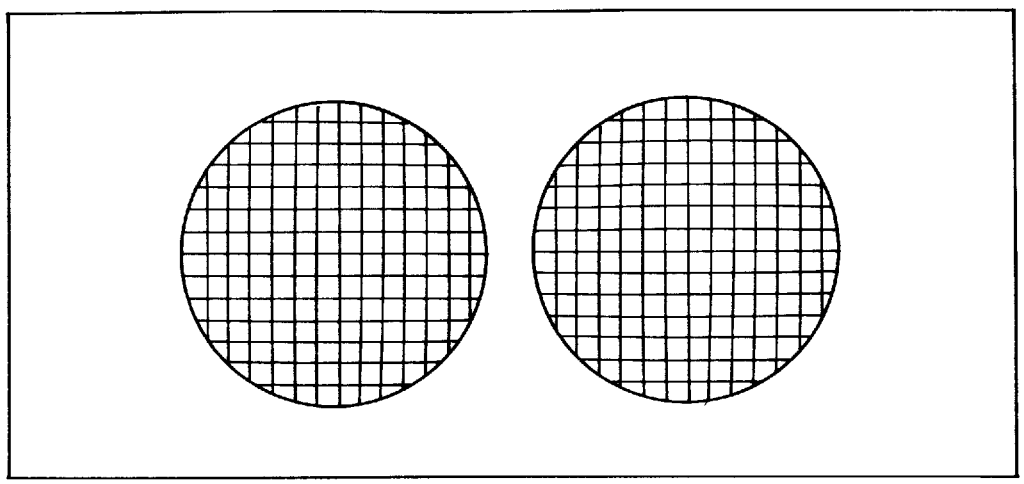
FIG. 18 (a)
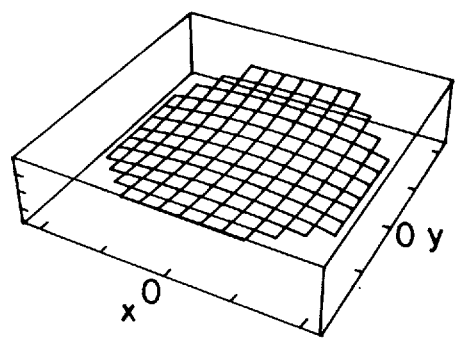
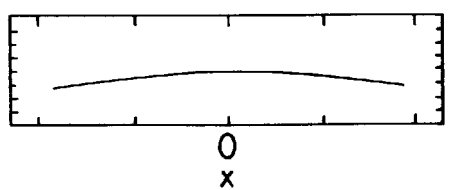
FIG. 18 (b)
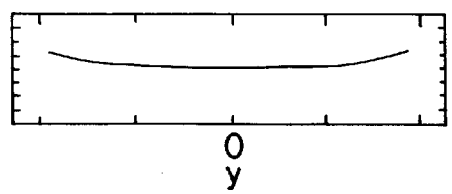
FIG. 18 (c)

MICROSCOPE OBJECTIVE AND SINGLE OBJECTIVE TYPE BINOCULAR STEREOMICROSCOPE SYSTEM

BACKGROUND OF THE INVENTION

The present invention relates generally to a microscope objective and a single objective type binocular stereomicroscope system, and more particularly to an objective for use on a single objective type binocular stereomicroscope system which, albeit having a parfocal length thereof shorter than a focal length thereof, reduces various aberrations as much as possible, and forms an image improved in terms of flatness, and a single objective type binocular stereomicroscope system using such an objective, which can be well manipulated while its viewing position remains invariable.

In record to a generally available single objective type stereomicroscope, its (parfocal) length from an object surface to a location where its objective is mounted thereon varies depending on the type, and magnification of the objective. Especially at a low magnification, lower than 1×, there is a focal length increase. The parfocal length of an objective for use on the conventional objective type binocular stereomicroscope is equivalent to or longer than the focal length thereof. When an object is observed using a low-power objective having a magnification of 0.5× for instance, that parfocal length is as long as about 60 mm to about 90 mm (typically 77 mm as shown in FIG. 15(b)), as compared with a viewing position of 1× as shown in FIG. 15(a). In FIGS. 15(a) and 15(b) reference numeral 1 represents a lens housing, 2 represents an eyepiece, 3 represents an objective having a magnification of 1×, 4 represents an objective having a magnification of 0.5×, 5 represents a lens barrel, 6 represents a parfocal length of the objective of 1×, 7 represents a parfocal length of the objective of 0.5×, and 8 represents a viewing position difference between when observing an object using the objective of 1× and when observing the object using the objective of 0.5×.

JP-B-60-227214 describes a binocular stereomicroscope equipped with a revolver unit. However, this stereomicroscope is difficult to manipulate because when the objective of 1× is changed to the objective of 0.5×, focusing control must be carried out over a length as long as about 60 mm to about 90 mm corresponding to the aforesaid viewing position difference.

The aforesaid problem may be solved by making the parfocal length of a low-magnification objective for a single objective type binocular stereomicroscope nearly equal to that of other objective, e.g., one having a focal length shorter than that of the aforesaid objective and a magnification of 1×. For a microscope objective it is common knowledge to have an invariable parfocal length; however, this is not the case for a conventional stereomicroscope. A chief reason for this is that, in view of aberration correction, difficulty is experienced in designing a low-magnification stereomicroscope objective such that its parfocal length is shorter than its focal length. To shorten the parfocal length without varying the focal length, it is required that a principal point position within the objective or on the object side be transposed to the image side. To achieve the aforesaid object, therefore, it is required to increase the power of each lens group within the objective. Since light rays propagating through the stereomicroscope objective are subject to decentration, a sample surface is viewed in different ways in the horizontal direction. In addition, the objective is often used in combination with a zooming optical system. The range of view, and NA (numerical aperture) of the objective vary with a magnification change of the zooming optical system. That there is much difficulty involved in the elimination of longitudinal chromatic aberration at high magnifications and the elimination of chromatic aberration of magnification at low magnifications.

It is noted that it is relatively easy to bring the parfocal length of a standard objective in alignment with that of an objective having a shorter focal length and a higher magnification because it is possible to transpose the mounting position on the image side by inserting a spacer or the like between the objective and its lens housing while taking advantage of the fact that a light flux leaving the objective lens is of afocal nature.

SUMMARY OF THE INVENTION

With such problems associated with the prior art in mind, it is therefore an object of the present invention to provide an objective system for use on a single objective type binocular stereomicroscope, which is designed to reduce various aberrations as much as possible, albeit having a parfocal length thereof shorter than a focal length thereof. It is another object of the present invention to provide a single objective type binocular stereomicroscope system comprising this objective system, which enables a viewing position to be lowered without recourse to a low-position binocular lens barrel, and can be well manipulated because the viewing position can be kept invariable even when at least two objective lenses are interchanged.

The aforesaid objects are achievable by the provision of an objective system for use on a single objective type binocular stereomicroscope comprising one objective lens for converting light from an object into an afocal light flux and two viewing optical units for receiving light emanating from said objective lens to form left and right images, which satisfies condition (1):

$$1.0 < FL/L < 1.6 \qquad (1)$$

where FL is a focal length of said objective system, and L is a distance from a first lens surface of said objective system on an image point side to a sample surface.

Preferably in this case, the objective system comprises, in order from an image side thereof, a first lens group including at least one lens having positive refracting power, a second lens group including a meniscus lens concave on an object side thereof, and a third lens group including a lens having negative refracting power.

It is also preferred that the objective system comprises, in order from an image side thereof, a first lens group including at least one lens having positive refracting power, a second lens group including a meniscus lens concave on an object side thereof, a third lens group having negative refracting power, and a fourth lens group including at least one lens having positive refracting power.

In these cases, it is preferred that the second and/or third lens groups are composed of cemented lenses.

It is further preferred that the objective system satisfies condition (2):

$$0.12 < |f_3/FL| < 0.3 \qquad (2)$$

where FL is the focal length of the entire objective system, and $f_3$ is a focal length of the third lens group.

Furthermore, it is preferred that the objective system satisfies condition (3):

$$\nu d_3 > \nu d_4 \qquad (3)$$

where $\nu d_3$ is an Abbe's number of a negative lens in the third lens group, and $\nu d_4$ is an Abbe's number of a positive lens in the fourth lens group.

Alternatively, the objective system of the invention may comprise, in order from an image side thereof, a first lens group including at least one lens having positive refracting power, a second lens group including a meniscus lens concave on an object side thereof, a third lens group including a negative meniscus lens convex on the object side, and a fourth lens group including at least one lens having positive refracting power.

Preferably in this case, the second lens group is a cemented lens.

The objective system also satisfies condition (4):

$$0.2 < |f_2/FL| < 0.45 \tag{4}$$

where FL is the focal length of the entire objective system, and $f_2$ is a focal length of the second lens group.

When the second lens group is a cemented lens, it is preferred that the objective system satisfies condition (5):

$$15 < |vd_{21} - vd_{22}| < 55 \tag{5}$$

where $vd_{21}$ is an Abbe's number of a positive lens providing one part of the cemented lens forming the second lens group, and $vd_{22}$ is an Abbe's number of a negative lens providing another part of the cemented lens.

In one preferable embodiment, the present invention provides a single objective type binocular stereomicroscope system comprising one objective lens for converting light from an object into an afocal light flux and two viewing optical units for receiving light emanating from the objective lens to form left and right images, which further comprises an interchanging unit having at least two objective lenses mounted thereon, and in which a focal length ratio between one objective lens having a longer focal length and other objective lens having a shorter focal length is at least 1.3 so that said stereomicroscope can have an invariable parfocal length even when said objective lenses are interchanged.

In another preferred embodiment, the present invention provides a single objective type binocular stereomicroscope system comprising one objective lens for converting light from an object into an afocal light flux and two viewing optical units for receiving light emanating from the objective lens to form left and right images, in which a focal length ratio between one objective lens having a longer focal length and the other objective lens having a shorter focal length is at least 1.3 so that said stereomicroscope can have an invariable parfocal length even when said objective lenses are interchanged.

BRIEF DESCRIPTION OF THE DRAWINGS

FIGS. 14(a), 14(b) and 14(c) are aberration diagrams of Example 7;

FIG. 15(a) is a schematic illustration of a parfocal length and viewing position when an objective of 1× is mounted on a single objective type binocular stereomicroscope;

FIG. 15(b) is a schematic illustration of a parfocal length and viewing position when an objective of 0.5× is mounted on a single objective type binocular stereomicroscope;

FIG. 16 is a schematic showing a fused image model under the observation of a stereomicroscope with both eyes;

FIG. 17 is a schematic showing distortions of images at optical paths for the left and right eyes;

FIG. 18(a) is a perspective view of an image plane observed through a single objective type binocular stereomicroscope;

FIG. 18(b) is a sectional view of the image plane of FIG. 18(a) as viewed in a horizontal direction;

FIG. 18(c) is a sectional view of the image plane of FIG. 18(a) as viewed in a vertical direction.

DESCRIPTION OF THE PREFERRED EMBODIMENTS

Figure 1:
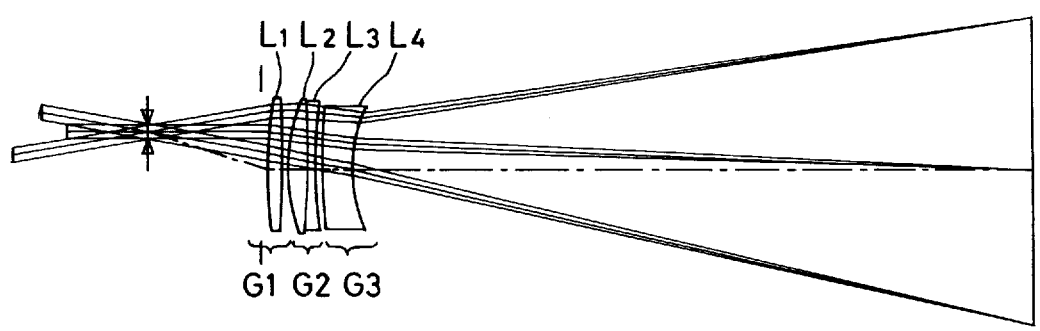
FIG. 1 is a section of a lens layout of Example 1 of the microscope objective of the invention.

A detailed account will now be given of why the aforesaid arrangements are adopted, and how they work.

In the objective system of the invention for use on a single objective type binocular stereomicroscope, at least one lens having positive refracting power is placed in the first lens group to convert light from an object point into an afocal light flux, and to make correction for astigmatism and curvature of field occurring at other lens groups. By the correction of astigmatism and curvature of field, it is possible to make the resulting images flat. Since longitudinal chromatic aberration is likely to occur at the first lens group, it is preferable to use less dispersible vitreous material, thereby eliminating chromatic aberration, because the correction of chromatic aberration at each subsequent lens group is relatively easily achievable.

The meniscus lens, concave on the object side, is placed in the second lens group to correct for coma occurring at the other lens groups. Furthermore, if the second lens group is constructed of a cemented lens, it is then possible to place both longitudinal chromatic aberration and chromatic aberration of magnification occurring at other groups in a well-balanced state.

The concave lens is placed in the third lens group to ensure of a viewing range allowed for the objective system, and the principal point is positioned on the image side of the objective system to shorten the parfocal length thereof. This concave lens, because of being much larger in refracting power than those in other groups, is likely to produce various aberrations such as coma, astigmatism, distortion, and chromatic aberration. If the third lens group is constructed of a cemented lens, however, it is then possible to reduce chromatic aberration.

By such an arrangement as mentioned above, it is possible to achieve an objective system that is shorter in parfocal length than in focal length and is designed for use on a single objective type binocular stereomicroscope. As the parfocal length becomes yet shorter, however, the refracting power of the third lens group becomes strong, and so produces large distortion. The distortion occurring at the third lens group may be reduced to some degree by locating the fourth lens group including at least one lens having positive refracting power between the third lens group and the object point. Also, at a low magnification of a zooming optical system, chromatic aberrations of magnification occurring at the first to third lens groups during zooming can be corrected with no deterioration of longitudinal chromatic aberration, because an off-axis chief ray is relatively farther off the optical axis.

With the aforesaid arrangement alone, it is possible to correct for distortion to some degree. For achieving further correction, however, it is required to bring the fourth lens group nearer to the object side than stated above. This in turn offers two problems, i.e., a reduction in the working distance or WD of the objective system, and an increase in the height of off-axis rays, which may otherwise cause the outer diameter of the objective system to become too large.

An image that can be observed under a stereomicroscope with the left and right eyes is made up of a fused image of an outer image height area A with respect to the center of a viewing optical path for the left eye and an inner image height area –B with respect to the center of a viewing optical path for the right eye, and a fused image of an outer image height area –A with respect to the center of the viewing optical path for the right eye and an inner image height area B with respect to the center of the viewing optical path for the left eye, as typically shown in FIG. 16. For a single objective type binocular stereomicroscope, it is known that a difference between distortion at the viewing optical path for the left eye and distortion at the viewing optical path for the right eye appears as a barrel form of distorted image, and a pincushion form of distorted image, respectively, as set forth in JP-B-7-60218. If the condition described in this publication is satisfied or if a distortion difference between the left eye and the right eye is reduced, it is then possible to reduce the amount of the barrel, and pincushion forms of distortion of image in the horizontal direction. The aforesaid arrangement complies with the condition prescribed in JP-B-7-60218, but has a large absolute value of distortion. Even though positive distortion is found by back tracing, it is noted that negative or barrel distortion occurs as actually observed by normal tracing. In the stereomicroscope designed to observe an erected image, an outer area with respect to the center and an inner area with respect to the center are reversed when the once formed image is viewed with one eye through a prism, a mirror or the like. Therefore, the image is viewed in the horizontal direction as in FIG. 17. This image, when fused with both eyes, is seen as in FIG. 18, from which it is found that the image is in a less distorted form in the horizontal direction but in a greatly distorted form in the vertical direction. In other words, it is required to reduce the distortion itself as much as possible. Note that FIG. 18(a) is a perspective diagram of the image plane, FIG. 18(b) is a sectional diagram of the image plane in the horizontal direction, and FIG. 18(c) is a sectional diagram of the image plane in the vertical direction.

The problem as mentioned just above can be solved by the arrangement and action as explained just below.

A stereomicroscope objective, unlike other objectives, has an exit pupil position located on an image side spaced away from said objective rather than within said objective. Consequently, distortion is determined depending on the focal length of each lens group in the objective system, and the distance of each lens group from the pupil position. In the case of the aforesaid arrangement, large negative distortion occurs at the third lens group, because the negative lens having very great refracting power is located farther off the pupil position. In order to make correction for such large negative distortion, the positive lens is placed in the fourth lens group. Nonetheless, this distortion cannot completely be corrected, resulting in overall negative distortion and, hence, a barrel form of image.

To avoid this, the negative refracting power of the meniscus lens in the aforesaid second lens group that is concave on the object side is increased, thereby simultaneously achieving the action of the second lens group on a lowering of ray height and correction of coma occurring at other groups, and the action of the third lens group on shortening the parfocal length of the objective system. Moreover, the negative meniscus lens having a convex surface directed toward an object is placed in the third lens group, thereby making the bending of an off-axis chief ray gentle from the third to the fourth lens group. It is thus possible to increase the negative refracting power available within the objective system and, hence, make correction for distortion.

Since, in this case, the negative refracting power of the second lens group becomes strong, it is preferable to reduce chromatic aberration by constructing it of a doublet consisting of a positive and a negative element.

A detailed account will now be given of each condition.

Condition (1) is provided to make the parfocal length of the single objective type binocular stereomicroscope of the invention shorter than the focal length thereof. When the lower limit of 1.0 in this condition is not reached, the parfocal length is longer than the focal length. When the upper limit of 1.6 is exceeded, on the other hand, the refracting power of each lens group becomes too strong to make correction for both longitudinal chromatic aberration and chromatic aberration of magnification.

Condition (2) is provided to shorten the parfocal length. When the lower limit of 0.12 is not reached, the refracting power of the third lens group becomes too strong to make correction for chromatic aberration, whereas the parfocal length becomes too long with the upper limit of 0.3 exceeded.

Condition (3) is provided to correct for chromatic aberration of magnification. When the objective system comprises four lens groups, chromatic aberration is introduced therein because the concave lens having very strong refracting power is located therein. To eliminate chromatic aberration of magnification occurring at the third lens that is group, the convex lens larger in dispersion than the concave lens in the third lens is placed in the fourth lens group.

Condition (4) is provided to shorten the parfocal length of the objective system comprising four lens groups with the third lens that is group including a negative meniscus lens convex on the object side. At less than the lower limit of 0.2, it is difficult to correct for chromatic aberration, whereas at more than the upper limit of 0.45 the parfocal length becomes too long.

Condition (5) is provided to make satisfactory correction for both longitudinal chromatic aberration and chromatic aberration of magnification when the second lens group is constructed of a cemented lens. At lower than the lower limit of 15 the longitudinal chromatic aberration remains undercorrected, whereas at more than the upper limit of 55 the chromatic aberration of magnification remains undercorrected at other lens groups.

Figure 19:
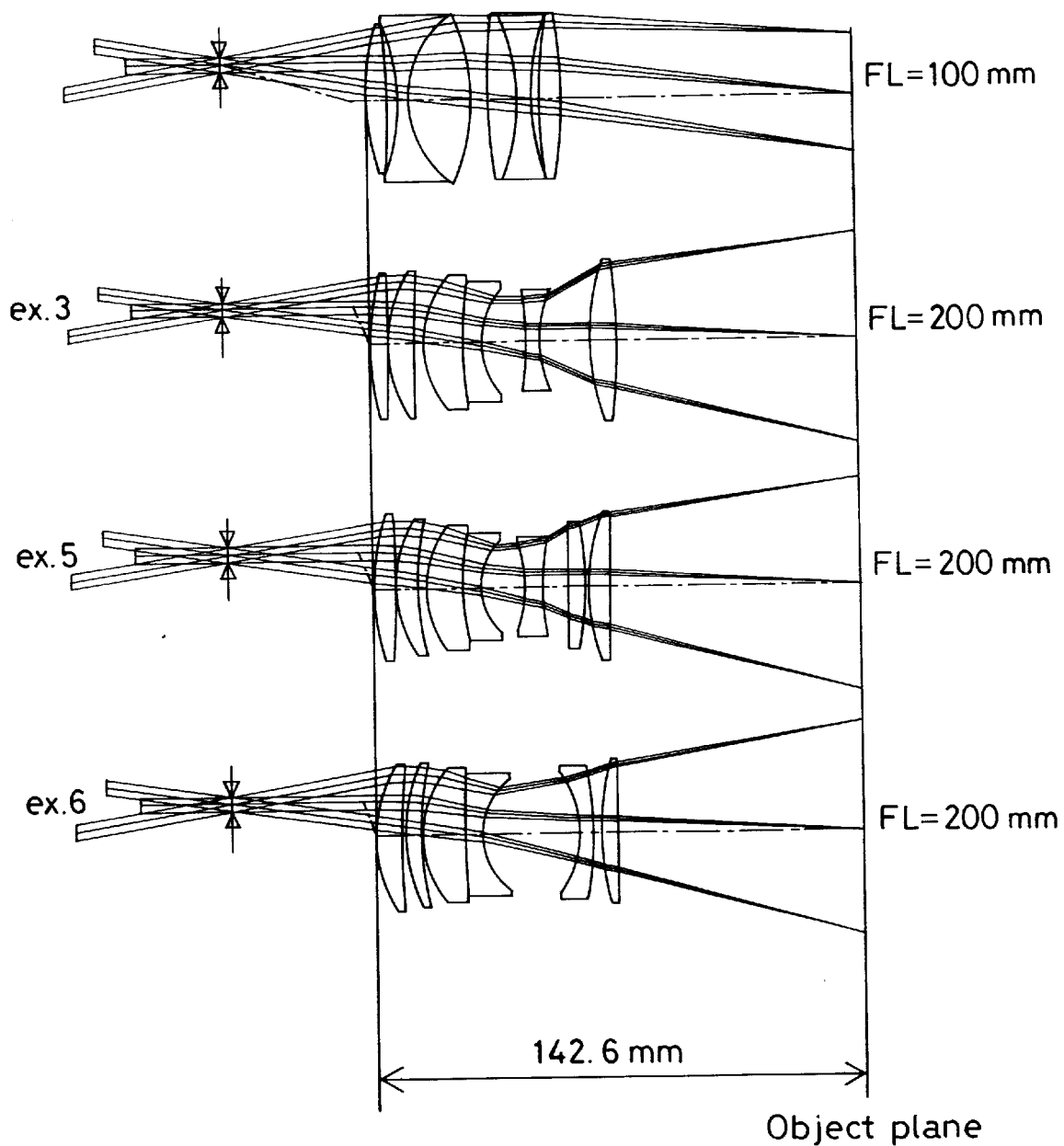
FIG. 19 is a schematic showing that the objective of 1×, and the objectives of Examples 3, 5, and 6 of the invention are invariable in terms of parfocal length.

By using the objective system having the aforesaid actions on a single objective type binocular stereomicroscope, it is possible to make the viewing position lower as compared with a single objective type binocular stereomicroscope using a conventional low-power objective. It is further possible to provide an objective type binocular stereomicroscope system which remains invariable in terms of focal length even when at least two objective lenses are interchanged by using a conventional objective of 1× having a parfocal length (142.6 mm) longer than a focal length or FL (100 mm), and the objectives of 0.5× according to Examples 3, 5, and 6, all having a focal length or FL of 200 mm and a parfocal length of 142.6 mm, as typically shown in FIG. 19.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

The single objective type binocular stereomicroscope of the invention and Examples 1 to 7 of the objective system for use on the same will now be explained.

Lens data on the objective system according to each example will be enumerated later. FIG. 1 is a section of the lens layout of Example 1 wherein a first lens group G1 consists of a double-convex positive lens L1, a second lens group G2 consists of a doublet made up of a double-convex positive lens L2 and a double-concave negative lens L3, and a third lens group G3 consists of a negative meniscus lens L4 that is concave on an object side of the system.

Figure 2:
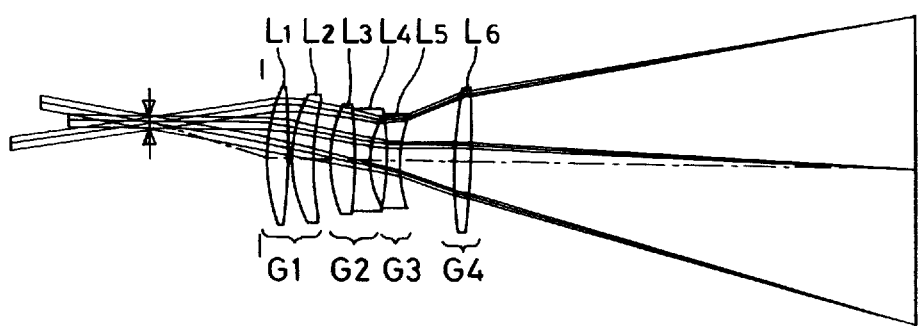
FIG. 2 is a section of a lens layout of Example 2 of the microscope objective of the invention.

FIG. 2 is a section of the lens layout of Example 2 wherein a first lens group G1 consists of a double-convex positive lens L1 and a positive meniscus lens L2 that is concave on an object side of the system, a second lens group G2 consists of a doublet made up of a double-convex positive lens L3 and a double-concave negative lens L4, a third lens group G3 consists of a double-concave negative lens L5, and a fourth lens group G4 consists of a double-convex positive lens L6.

Figure 3:
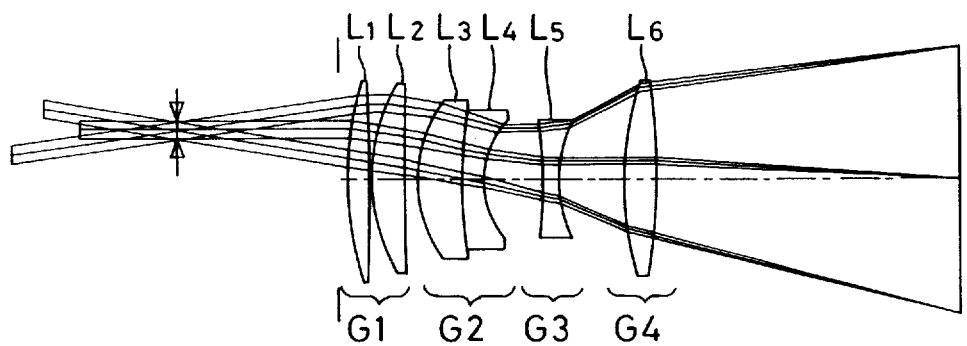
FIG. 3 is a section of a lens layout of Example 3 of the microscope objective of the invention.

FIG. 3 is a section of the lens layout of Example 3 wherein a first lens group G1 consists of a plano-convex positive lens L1 and a positive meniscus lens L2 that is concave on an object side of the system, a second lens group G2 that is consists of a doublet made up of a positive meniscus lens L3 that is concave on the object side and a negative meniscus lens L4 that is concave on the object side. A third lens group G3 consists of a double-concave negative lens L5, and a fourth lens group G4 consists of a double-convex positive lens L6.

Figure 4:
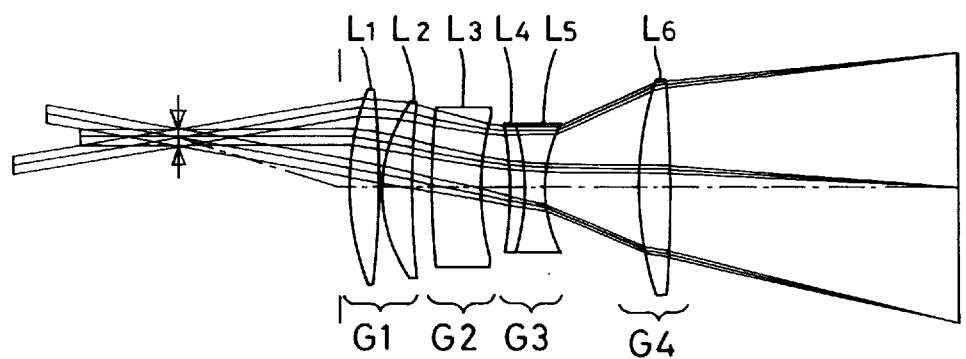
FIG. 4 is a section of a lens layout of Example 4 of the microscope objective of the invention.

FIG. 4 is a section of the lens layout of Example 4 wherein a first lens group G1 consists of a double-convex positive lens L1 and a positive meniscus lens L2 that is concave on an object side of the system. A second lens group G2 consists of a negative meniscus lens L3 that is concave on the object side. A third lens group G3 consists of a doublet made up of a positive meniscus lens L4 that is convex on the object side and a double-concave negative lens L5, and a fourth lens group G4 consists of a double-convex positive lens L6.

Figure 5:
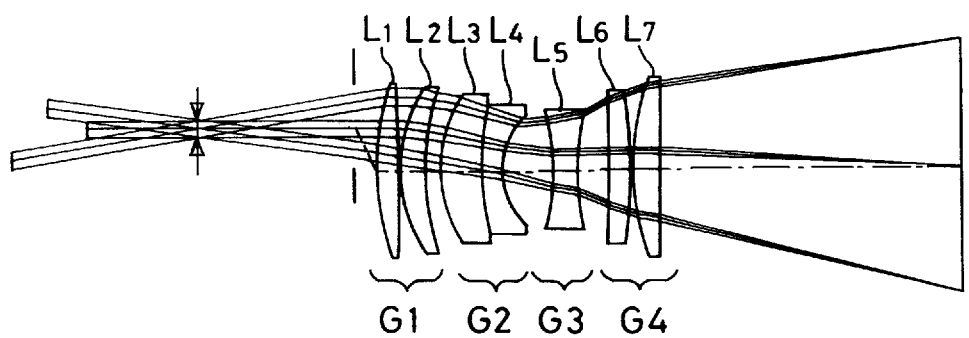
FIG. 5 is a section of a lens layout of Example 5 of the microscope objective of the invention.

FIG. 5 is a section of the lens layout of Example 5 wherein a first lens group G1 consists of a double-convex positive lens L1 and a positive meniscus lens L2 that is concave on an object side of the system. A second lens group G2 consists of a doublet made up of a positive meniscus lens L3 that is concave on the object side and a negative meniscus lens L4 that is concave on the object side. A third lens group G3 consists of a double-concave positive lens L5, and a fourth lens group G4 consists of a double-convex positive lens L6 and a plano-convex positive lens L7.

Figure 6:
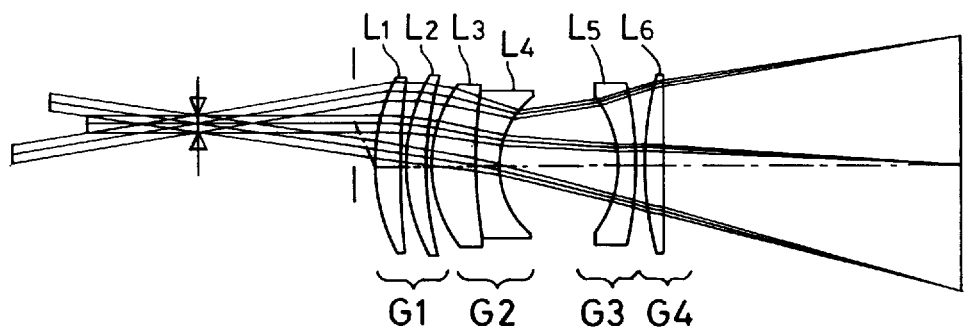
FIG. 6 is a section of a lens layout of Example 6 of the microscope objective of the invention.

FIG. 6 is a section of the lens layout of Example 6 wherein a first lens group G1 consists of two positive meniscus lenses L1 and L2, each concave on an object side of the system. A second lens group G2 consists of a doublet made up of a positive meniscus lens L3 that is concave on the object side and a negative meniscus lens L4 that is concave on the object side. A third lens group G3 consists of a negative meniscus lens L5 that is convex on the object side, and a fourth lens group G4 consists of a plano-convex positive lens L6.

Figure 7:
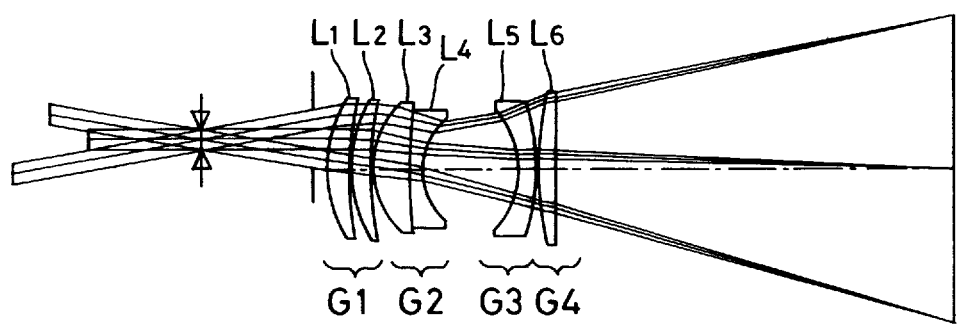
FIG. 7 is a section of a lens layout of Example 7 of the microscope objective of the invention.
Figure 8A:
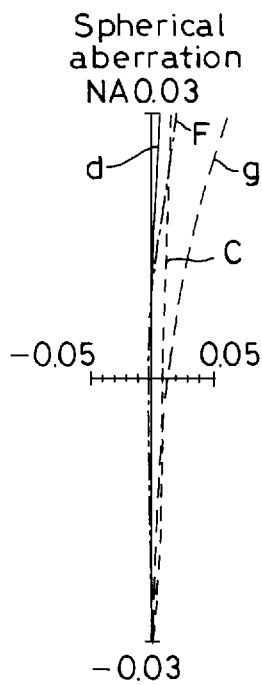
FIGS. 8(a), 8(b) and 8(c) are aberration diagrams of Example 1.
Figure 8B:
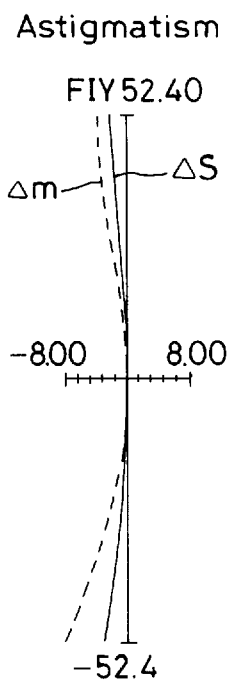
Figure 8C:
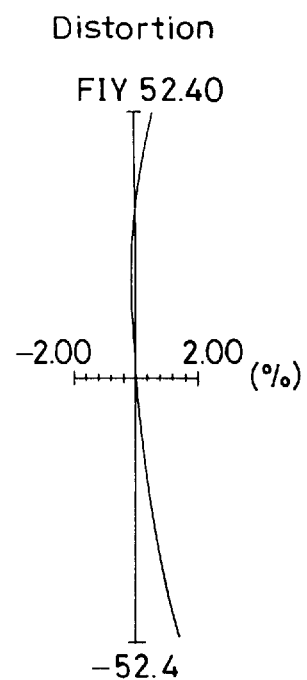
Figure 9A:
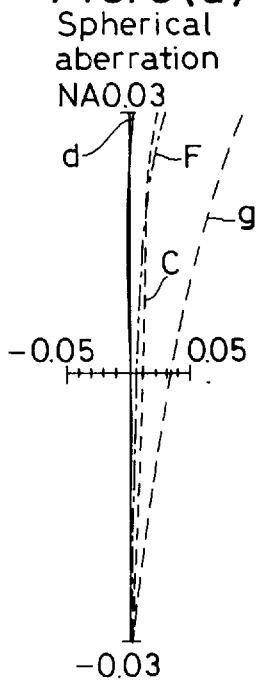
FIGS. 9(a), 9(b) and 9(c) are aberration diagrams of Example 2.
Figure 9B:
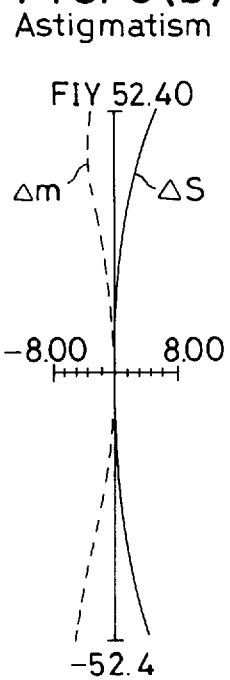
Figure 9C:
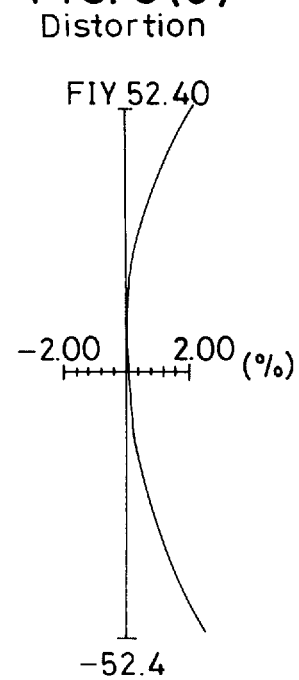
Figure 10A:
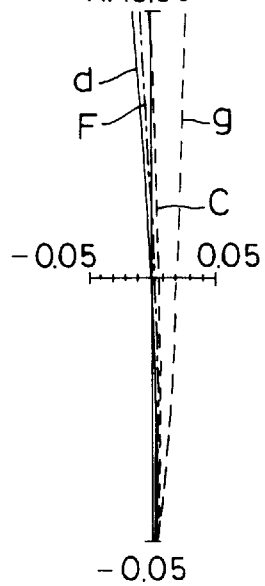
FIGS. 10(a), 10(b) and 10(c) are aberration diagrams of Example 3.
Figure 10B:
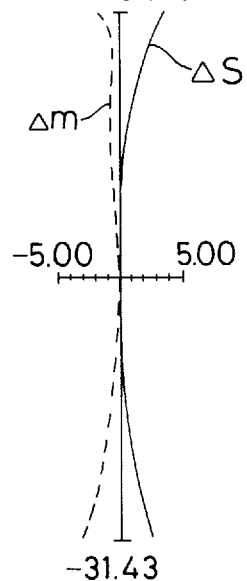
Figure 10C:
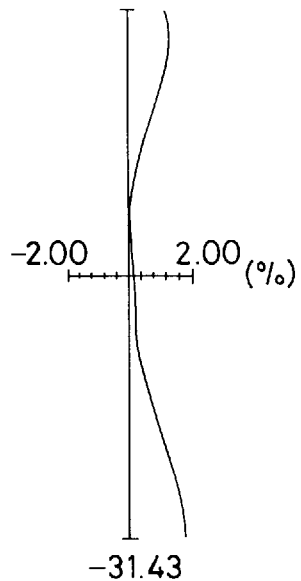
Figure 11A:
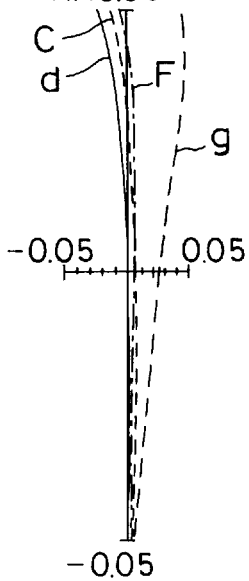
FIGS. 11(a), 11(b) and 11(c) are aberration diagrams of Example 4.
Figure 11B:
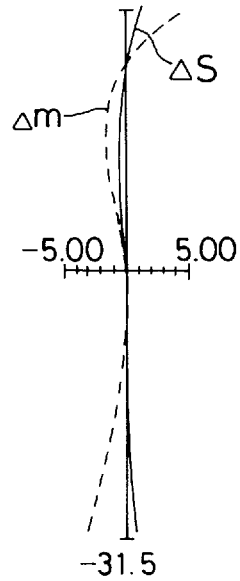
Figure 11C:
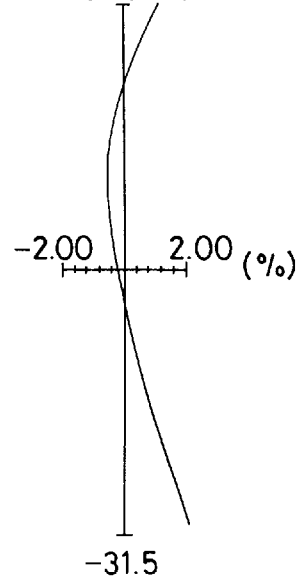
Figure 12A:
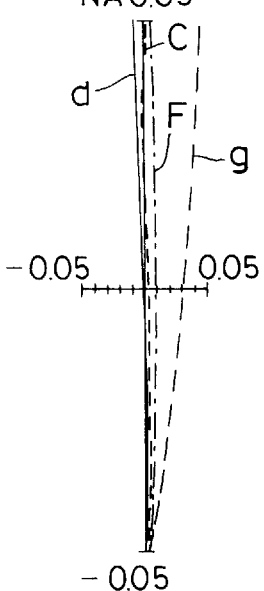
FIGS. 12(a), 12(b) and 12(c) are aberration diagrams of Example 5.
Figure 12B:
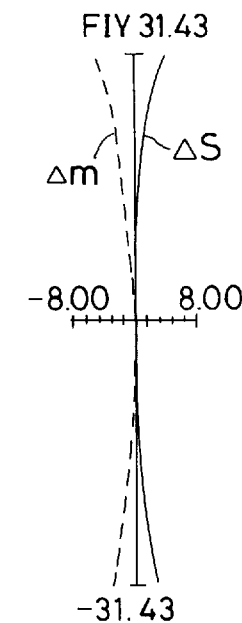
Figure 12C:
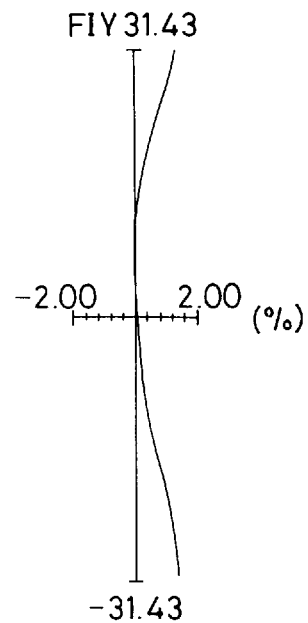
Figure 13A:
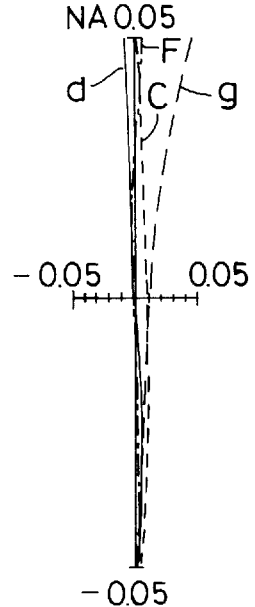
FIGS. 13(a), 13(b) and 13(c) are aberration diagrams of Example 6.
Figure 13B:
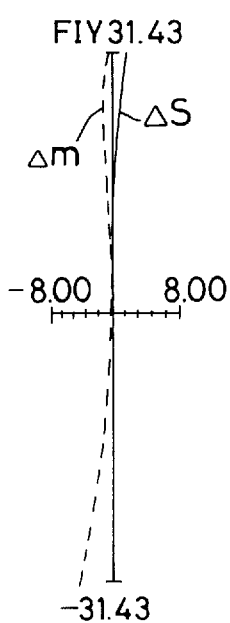
Figure 13C:
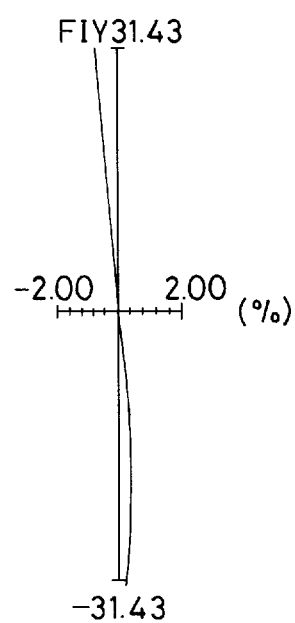

FIG. 7 is a section of the lens layout of Example 7 wherein a first lens group G1 consists of two positive meniscus lenses L1 and L2, each of which are concave on an object side of the system. A second lens group G2 consists of a doublet made up of a positive meniscus lens L3 that is concave on the object side and a negative meniscus lens L4 that is concave on the object side. A third lens group G3 consists of a negative meniscus lens L5 that is convex on the object side, and a fourth lens group G4 consists of a plano-convex positive lens L6.

Enumerated below are lens data for each example. Symbols used hereinafter but not hereinbefore are:

FL=the composite focal length of the entire system, $f_1$=the focal length of the first lens group G1, $f_2$=the focal length of the second lens group G2, $f_3$=the focal length of the third lens group G3, $f_4$=the focal length of the fourth lens group G4, WD=the working distance of the system, $r_1, r_2, \ldots$ =the radii of curvature of the lens surfaces as viewed in order from the image side, $d_1, d_2, \ldots$ =the inter-lens surface spaces as viewed in order from the image side, $n_{d1}, n_{d2}, \ldots$ =the d-line refractive indices of the lenses as viewed in order from the image side, and $V_{d1}, V_{d2}, \ldots$ =the Abbe's number of the lenses as viewed in order from the image side.

Example 1

| | | | |
|---|---|---|---|
| $r_1$ = 128.4194 | $d_1$ = 5.0 | $n_{d1}$ = 1.49700 | $v_{d1}$ = 81.61 |
| $r_2$ = −1400.5103 | $d_2$ = 2.0 | | |
| $r_3$ = 58.7447 | $d_3$ = 6.5842 | $n_{d2}$ = 1.67790 | $v_{d2}$ = 55.33 |
| $r_4$ = −380.3135 | $d_4$ = 3.1819 | $n_{d3}$ = 1.64769 | $v_{d3}$ = 33.80 |
| $r_5$ = 167.1297 | $d_5$ = 2.073 | | |
| $r_6$ = 263.7734 | $d_6$ = 11.213 | $n_{d4}$ = 1.67790 | $v_{d4}$ = 55.33 |
| $r_7$ = 47.1098 | | | |
| WD = 229.9422 | | | |
| FL = 300 | | | |
| $f_1$ = 236.9441 | | | |
| $f_2$ = 124.9586 | | | |
| $f_3$ = −86.4108 | | | |

Example 2

| | | | |
|---|---|---|---|
| $r_1$ = 59.9883 | $d_1$ = 7.0 | $n_{d1}$ = 1.48749 | $v_{d1}$ = 70.21 |
| $r_2$ = −305.8585 | $d_2$ = 1.0 | | |
| $r_3$ = 45.2752 | $d_3$ = 7.6520 | $n_{d2}$ = 1.49700 | $v_{d2}$ = 81.61 |
| $r_4$ = 77.3291 | $d_4$ = 6.3079 | | |
| $r_5$ = 48.3261 | $d_5$ = 8.3698 | $n_{d3}$ = 1.51633 | $v_{d3}$ = 64.15 |

-continued

| | | | |
|---|---|---|---|
| $r_6 = -184.8373$ | $d_6 = 5.1552$ | $n_{d1} = 1.66680$ | $v_{d4} = 33.05$ |
| $r_7 = 28.9792$ | $d_7 = 6.5$ | | |
| $r_8 = -74.8316$ | $d_8 = 3.5$ | $n_{d5} = 1.58913$ | $v_{d5} = 61.18$ |
| $r_9 = 46.0791$ | $d_9 = 18.3043$ | | |
| $r_{10} = 123.5716$ | $d_{10} = 6.0$ | $n_{d6} = 1.74077$ | $v_{d6} = 27.79$ |
| $r_{11} = -300.0520$ | | | |
| WD = 150.2042 | | | |
| FL = 300 | | | |
| $f_1 = 68.2489$ | | | |
| $f_2 = -90.6736$ | | | |
| $f_3 = -47.8936$ | | | |
| $f_4 = 118.8715$ | | | |
| Example 3 | | | |
| $r_1 = 82.1503$ | $d_1 = 5.0$ | $n_{d1} = 1.48749$ | $v_{d1} = 70.21$ |
| $r_2 = \infty$ | $d_2 = 0.8$ | | |
| $r_3 = 45.3205$ | $d_3 = 7.0984$ | $n_{d2} = 1.49700$ | $v_{d2} = 81.61$ |
| $r_4 = 267.5734$ | $d_4 = 3.6989$ | | |
| $r_5 = 31.8845$ | $d_5 = 10.5498$ | $n_{d3} = 1.49700$ | $v_{d3} = 81.61$ |
| $r_6 = 104.3067$ | $d_6 = 5.6324$ | $n_{d4} = 1.71850$ | $v_{d4} = 33.52$ |
| $r_7 = 22.5920$ | $d_7 = 13.1907$ | | |
| $r_8 = 83.6903$ | $d_8 = 3.9317$ | $n_{d5} = 1.74320$ | $v_{d5} = 49.31$ |
| $r_9 = 31.8688$ | $d_9 = 14.6705$ | | |
| $r_{10} = 64.4222$ | $d_{10} = 8.0$ | $n_{d6} = 1.63980$ | $v_{d6} = 34.48$ |
| $r_{11} = -169.0193$ | | | |
| WD = 70.0330 | | | |
| FL = 200 | | | |
| $f_1 = 66.8247$ | | | |
| $f_2 = -110.9858$ | | | |
| $f_3 = -30.6110$ | | | |
| $f_4 = 73.8919$ | | | |
| Example 4 | | | |
| $r_1 = 53.8993$ | $d_1 = 7.5$ | $n_{d1} = 1.49700$ | $v_{d1} = 81.61$ |
| $r_2 = -193.6707$ | $d_2 = 0.8$ | | |
| $r_3 = 36.6745$ | $d_3 = 6.1455$ | $n_{d2} = 1.48749$ | $v_{d2} = 70.21$ |
| $r_4 = 106.2015$ | $d_4 = 4.9634$ | | |
| $r_5 = 167.7944$ | $d_5 = 12.0840$ | $n_{d3} = 1.71736$ | $v_{d3} = 29.51$ |
| $r_6 = 47.9490$ | $d_6 = 6.4201$ | | |
| $r_7 = -126.5295$ | $d_7 = 4.0041$ | $n_{d4} = 1.51633$ | $v_{d4} = 64.15$ |
| $r_8 = -56.2616$ | $d_8 = 4.3169$ | $n_{d5} = 1.72000$ | $v_{d5} = 43.70$ |
| $r_9 = 30.4653$ | $d_9 = 22.8101$ | | |
| $r_{10} = 85.2722$ | $d_{10} = 7.0$ | $n_{d6} = 1.72342$ | $v_{d6} = 37.95$ |
| $r_{11} = -300.0000$ | | | |
| WD = 66.5442 | | | |
| FL = 180 | | | |
| $f_1 = 49.1479$ | | | |
| $f_2 = -97.6977$ | | | |
| $f_3 = -31.1653$ | | | |
| $f_4 = 92.4901$ | | | |
| Example 5 | | | |
| $r_1 = 59.5881$ | $d_1 = 6.0$ | $n_{d1} = 1.49700$ | $v_{d1} = 81.61$ |
| $r_2 = -742.2151$ | $d_2 = 0.2036$ | | |
| $r_3 = 36.5520$ | $d_3 = 6.9$ | $n_{d2} = 1.49700$ | $v_{d2} = 81.61$ |
| $r_4 = 74.5700$ | $d_4 = 2.7484$ | | |
| $r_5 = 31.4805$ | $d_5 = 10.3547$ | $n_{d3} = 1.49700$ | $v_{d3} = 81.61$ |
| $r_6 = 72.6521$ | $d_6 = 5.4026$ | $n_{d4} = 1.71850$ | $v_{d4} = 33.52$ |
| $r_7 = 17.9832$ | $d_7 = 12.4867$ | | |
| $r_8 = -46.3071$ | $d_8 = 5.4037$ | $n_{d5} = 1.74320$ | $v_{d5} = 49.31$ |
| $r_9 = 51.0700$ | $d_9 = 7.8071$ | | |
| $r_{10} = 79.3737$ | $d_{10} = 5.0$ | $n_{d6} = 1.62004$ | $v_{d6} = 36.26$ |
| $r_{11} = -112.3895$ | $d_{11} = 0.9109$ | | |
| $r_{12} = 63.5767$ | $d_{12} = 6.5$ | $n_{d7} = 1.62004$ | $v_{d7} = 36.26$ |
| $r_{13} = \infty$ | | | |
| WD = 72.8813 | | | |
| FL = 200 | | | |
| $f_1 = 61.1448$ | | | |
| $f_2 = -67.7353$ | | | |
| $f_3 = -31.9225$ | | | |
| $f_4 = 62.6109$ | | | |
| Example 6 | | | |
| $r_1 = 44.1653$ | $d_1 = 7.0$ | $n_{d1} = 1.48749$ | $v_{d1} = 70.21$ |
| $r_2 = 200.4730$ | $d_2 = 0.8$ | | |
| $r_3 = 45.1729$ | $d_3 = 4.9$ | $n_{d2} = 1.49700$ | $v_{d2} = 81.61$ |
| $r_4 = 74.1478$ | $d_4 = 1.0$ | | |
| $r_5 = 31.2811$ | $d_5 = 11.4965$ | $n_{d3} = 1.49700$ | $v_{d3} = 81.61$ |
| $r_6 = 139.0851$ | $d_6 = 5.6941$ | $n_{d4} = 1.80440$ | $v_{d4} = 39.59$ |
| $r_7 = 21.0069$ | $d_7 = 28.9681$ | | |
| $r_8 = -27.1947$ | $d_8 = 4.2$ | $n_{d5} = 1.48749$ | $v_{d5} = 70.21$ |
| $r_9 = -79.5088$ | $d_9 = 1.9322$ | | |
| $r_{10} = 84.5490$ | $d_{10} = 5.0287$ | $n_{d6} = 1.63980$ | $v_{d6} = 34.46$ |
| $r_{11} = \infty$ | | | |
| WD = 71.5807 | | | |
| FL = 200 | | | |
| $f_1 = 75.7738$ | | | |
| $f_2 = -73.3306$ | | | |
| $f_3 = -87.0752$ | | | |
| $f_4 = 132.1493$ | | | |
| Example 7 | | | |
| $r_1 = 47.8629$ | $d_1 = 7.0$ | $n_{d1} = 1.48749$ | $v_{d1} = 70.21$ |
| $r_2 = 92.0432$ | $d_2 = 0.96$ | | |
| $r_3 = 50.3491$ | $d_3 = 7.0$ | $n_{d2} = 1.49700$ | $v_{d2} = 81.61$ |
| $r_4 = 125.1819$ | $d_4 = 1.2905$ | | |
| $r_5 = 33.2896$ | $d_5 = 11.0007$ | $n_{d3} = 1.48749$ | $v_{d3} = 70.21$ |
| $r_6 = 131.2747$ | $d_6 = 6.1004$ | $n_{d4} = 1.80440$ | $v_{d4} = 39.59$ |
| $r_7 = 23.9817$ | $d_7 = 31.474$ | | |
| $r_8 = -29.9215$ | $d_8 = 5.5$ | $n_{d5} = 1.51633$ | $v_{d5} = 64.14$ |
| $r_9 = -70.3003$ | $d_9 = 1.0$ | | |
| $r_{10} = 124.6145$ | $d_{10} = 6.0$ | $n_{d6} = 1.71736$ | $v_{d6} = 29.51$ |
| $r_{11} = \infty$ | | | |
| WD = 132.6738 | | | |
| FL = 300 | | | |
| $f_1 = 90.9042$ | | | |
| $f_2 = -89.2318$ | | | |
| $F_3 = -105.7999$ | | | |
| $f_4 = 173.7122$ | | | |

Aberration diagrams of Examples 1 to 7 as referred to above are shown in FIGS. 8 to 14 wherein NA stands for numerical aperture, and FIY represents image height.

As can be understood from the foregoing description, the present invention makes it possible to provide an objective system for use on a single objective type binocular stereomicroscope which, albeit having a parfocal length thereof shorter than a focal length thereof, can reduce various aberrations as much as possible and form images of sufficient flatness. By using this microscope objective system on a single objective type binocular stereomicroscope, it is also possible to provide a single objective type binocular stereomicroscope system which can have a low viewing position without recourse to any low-position binocular lens barrel, and can be well manipulated while the viewing position is invariable even when at least two objectives are interchanged.

What I claim is:

1. An objective system for use on a single objective type binocular stereomicroscope comprising an objective lens for converting light from an object into an afocal light flux satisfying the condition (1):

$$1.0 < FL/L < 1.6 \tag{1}$$

where FL is a focal length of said objective system, and L is a distance from a first lens surface of said objective system on an image point side to a sample surface.

2. The microscope objective system of claim 1, further comprising, in order from an image side thereof, a first lens group including at least one lens having positive refracting poser, a second lens group including a meniscus lens concave on an object side thereof, and a third lens group including a lens having negative refracting power.

3. The microscope objective system of claim 1, further comprising, in order from an image side thereof, a first lens group including at least one lens having positive redacting power, a second lens group including a meniscus lens concave on an object side thereof, a third lens group having negative refracting power and a fourth lens group including at least one lens having positive refracting power.

4. The microscope objective according to claim 2, wherein said second lens group is a cemented lens.

5. The microscope objective according to claim 2, wherein said third lens group is a cemented lens.

6. The microscope objective according to claim 3, wherein said second lens group is a cemented lens.

7. The microscope objective according to claim 3, wherein said third lens group is a cemented lens.

8. The microscope objective system of any one of claim 2, 3 or 4–7, inclusive, which satisfies condition (2):

$$0.12 < |f_3/FL| < 0.3 \qquad (2)$$

where FL is a focal length of the entire objective system, and $f_3$ is a focal length of the third lens group.

9. The microscope objective system of claim 3, which satisfies condition (3):

$$v_{d3} > v_{d4} \qquad (3)$$

where $v_{d3}$ is an Abbe's number of a negative lens in the third lens group, and $v_{d4}$ is an Abbe's number of a positive lens in the fourth lens group.

10. The microscope objective system of claim 1, further comprising, in order from an image side thereof, a first lens group including at least one lens having positive refracting power, a second lens group including a meniscus lens concave on an object side thereof, a third lens group including a negative meniscus lens convex on the object side, and a fourth lens group including at least one lens having positive refracting power.

11. The microscope objective system of claims 10, wherein the second lens group is a cemented lens.

12. The microscope objective system of claim 10 or 11, which further satisfies condition (4):

$$0.2 < |f_2/FL| < 0.45 \qquad (4)$$

where FL is a focal length of the entire objective system, and $f_2$ is a focal length of the second lens group.

13. The microscope objective system of claim 4 or 6, which further satisfies condition (5):

$$5 < |vd_{21} - vd_{22}| < 55 \qquad (5)$$

where $vd_{21}$ is an Abbe's number of a positive lens providing one part of the cemented lens forming the second lens group, and $vd_{22}$ is an Abbe's number of a negative lens providing another part of the cemented lens.

* * * * *

UNITED STATES PATENT AND TRADEMARK OFFICE
CERTIFICATE OF CORRECTION

PATENT NO. : 5,852,515
DATED : December 22, 1998
INVENTOR(S) : Kurata

Page 1 of 1

It is certified that error appears in the above-identified patent and that said Letters Patent is hereby corrected as shown below:

Claim 1,
Line 6, after "FL is a focal length of" change "said" to -- the entire --.

Signed and Sealed this

Twenty-first Day of August, 2001

Attest:

*Nicholas P. Godici*

NICHOLAS P. GODICI
*Attesting Officer*     *Acting Director of the United States Patent and Trademark Office*